SYNCHRONIZING CORRECTOR CIRCUIT

Filed June 27, 1945 2 Sheets-Sheet 1

INVENTOR
REGINALD G. SCHULER
BY Emery Robinson
ATTORNEY

INVENTOR
REGINALD G. SCHULER
BY Emery Robinson
ATTORNEY

Patented Jan. 31, 1950 2,495,946

UNITED STATES PATENT OFFICE 2,495,946

SYNCHRONIZING CORRECTOR CIRCUIT

Reginald G. Schuler, Highland Park, Ill., assignor to Teletype Corporation, Chicago, Ill., a corporation of Delaware Application June 27, 1945, Serial No. 601,818

4 Claims. (Cl. 178—69.5)

The present invention relates to multiplex telegraph systems, and more particularly to corrector circuits to be utilized therewith.

In the operation of multiplex telegraph systems, it is necessary to provide means to correct the speed of the receiving distributor with respect to the incoming line signals, so as to assure that the distributor and the incoming impulses are synchronized.

Such speed correction has previously been made by means of a tuning fork controlling the distributor driving means. While such corrector circuits have worked satisfactorily it has been necessary to spend considerable time in the manual adjusting of the tuning fork in order to automatically obtain the necessary correction. Likewise, such adjusting must be made repeatedly. Further, expensive automatic speed control equipment is necessary.

Accordingly, an object of the present invention is to provide corrector means which operate satisfactorily and with a minimum of maintenance.

A further object of the invention is to provide a crystal controlled distributor driving means which is varied by means of a comparison of the received signals and the driving means.

Another object of the invention is to provide corrector means comprising inertialess relays.

A still further object of the invention is to provide crystal control means and means for varying said crystal control means in order to insure sensitive corrector means.

A preferred embodiment of the invention comprises a crystal controlled oscillator circuit at the receiving station for driving the receiving distributor, the frequency of which is controlled by means of tubes which compare the oscillator voltage with the signal impulses and in turn control a polar relay for placing a condenser in parallel with the crystal to alter the impedance of the oscillator circuit, thus altering the crystal frequency and effecting correction.

A second embodiment of the invention provides a crystal controlled oscillator circuit but substitutes mechanical relays for the tubes of the preferred embodiment in a different operational manner.

A more detailed understanding of the invention may be had from the following description with reference to the accompanying drawings, in which Fig. 1 is a diagrammatic view of a preferred embodiment of the circuit and apparatus embodying the invention;

Figure 1:
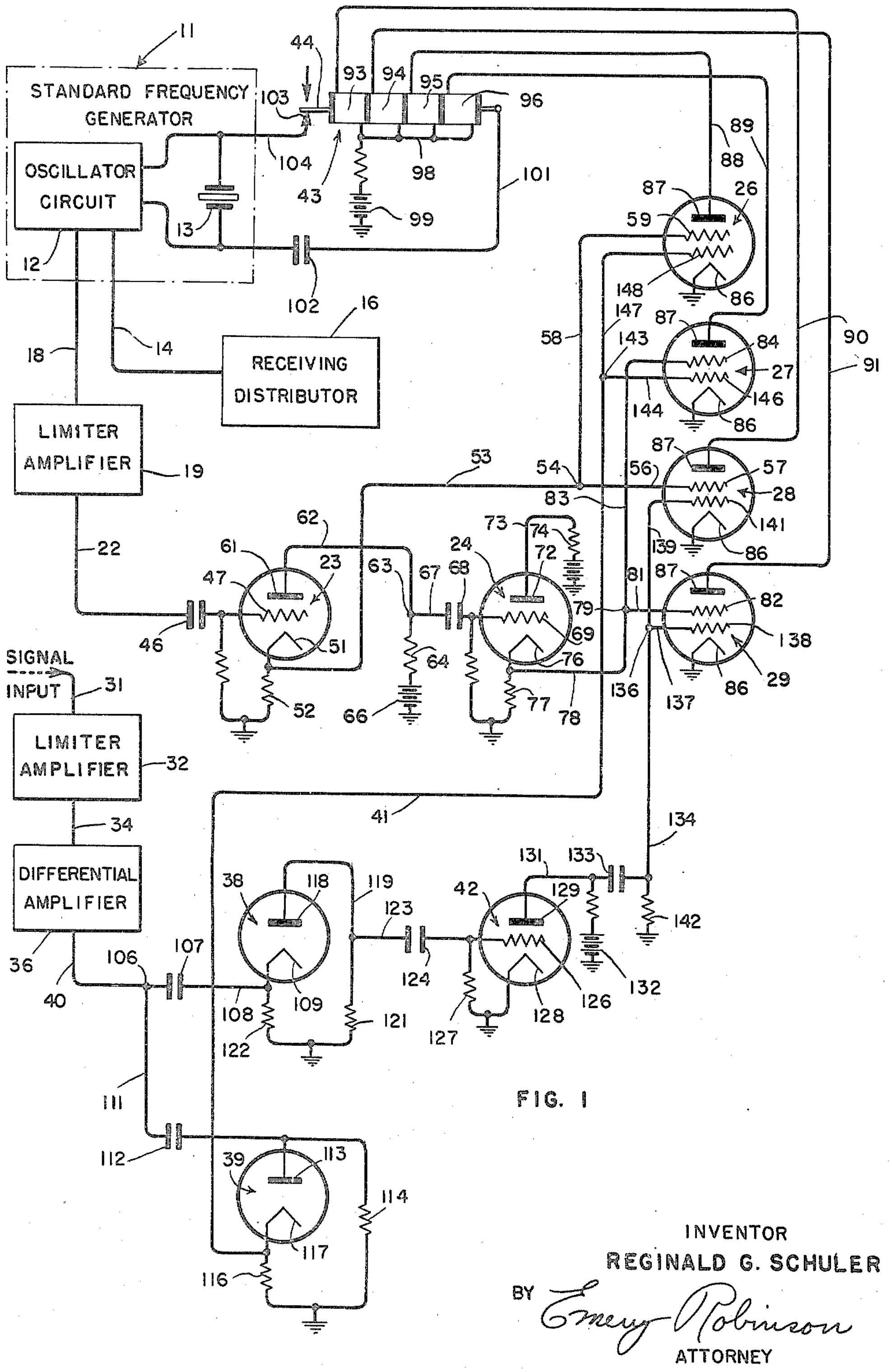
Figures 2, 3:
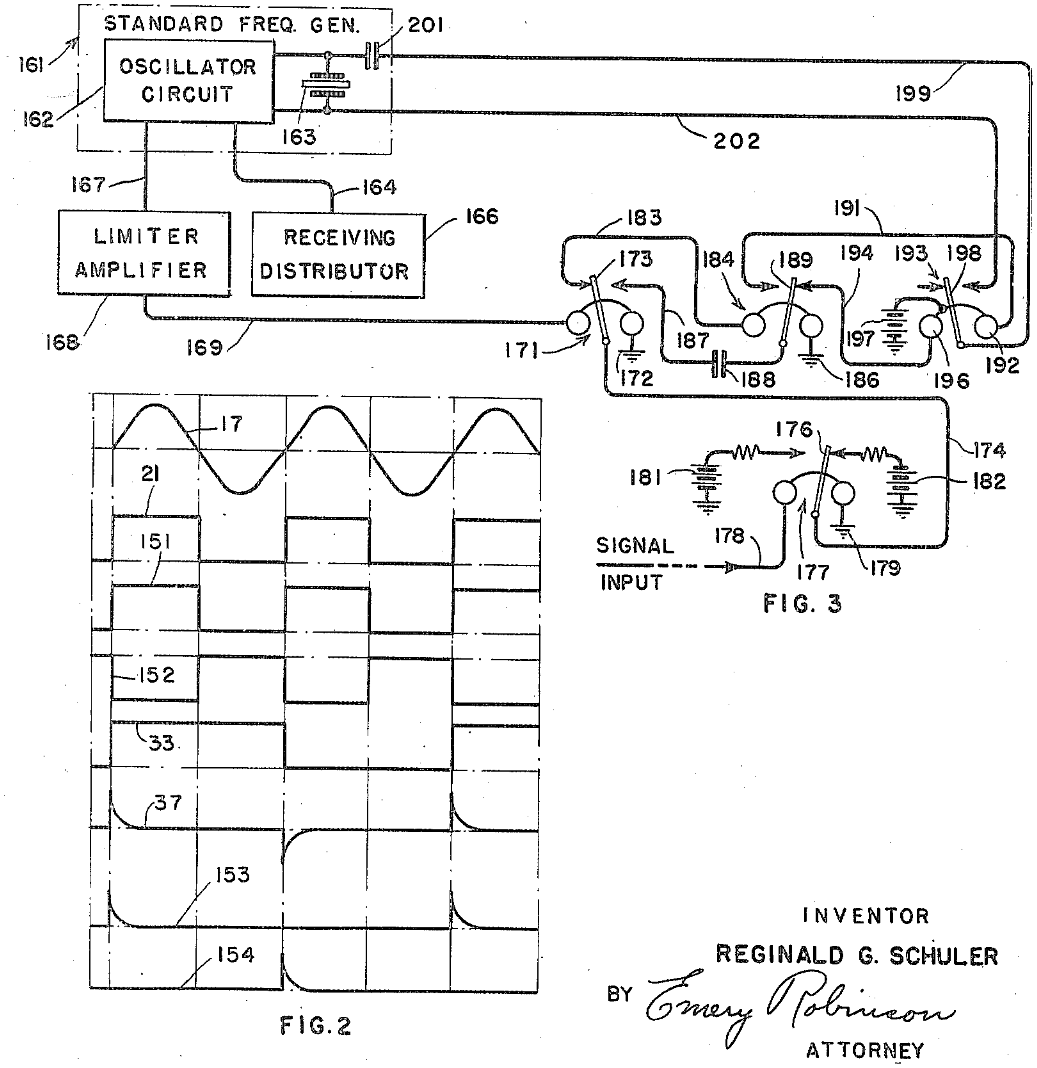
Fig. 2 is a voltage characteristic chart.
Fig. 3 is a diagrammatic view of a second embodiment of the circuit and apparatus embodying the invention.

The preferred embodiment of the invention is disclosed in Fig. 1, with voltage characteristic curves for this circuit disclosed in Fig. 2.

Referring to Fig. 1, the circuit, in general, comprises a standard frequency generator 11 which is composed of an oscillator circuit 12 which is connected to and is controlled by a piezo electric crystal 13. The oscillator circuit 12 is connected by means of a conductor 14 to a receiving distributor 16 of which it controls the speed. The receiving distributor 16 may be of any well known type or may be of an electronic variety such as disclosed in copending U. S. application Serial No. 596,295, filed by T. A. Hansen on May 28, 1945.

The oscillator circuit generates a voltage having a sine wave characteristic such as is shown as curve 17 in Fig. 2. The sine wave is impressed over a conductor 18 to a limiter amplifier 19 which squares off the sine wave to a voltage having a square wave characteristic such as disclosed in curve 21 of Fig. 2. The square wave passes from the limiter amplifier 19 over a conductor 22.

A pair of triode tubes 23 and 24 are provided which are responsive to the square wave voltage from the limiter amplifier 19 in a manner which will be described hereinafter. The output of the triodes 23 and 24 is impressed on the grids of four tetrodes 26 to 29, inclusive, in a manner and for a purpose to be described hereinafter.

Code signals which are transmitted from a distant station over a suitable signaling channel are received at the station shown in Fig. 1 over a conductor 31, and are passed through a limiter amplifier 32 to square up the voltage characteristic in the event that it is not in square wave form. The output of the limiter amplifier 32, which has a characteristic of a squared up wave, is shown as curve 33 in Fig. 2. In the event that the incoming line signals are ideal, from a signaling standpoint, they will have the same characteristic and form as curve 33. The limiter amplifier 32 is connected by means of conductor 34 to a differential amplifier 36 wherein the square wave shown as 33 is altered to have a pulse wave characteristic such as is shown on curve 37 of Fig. 2. A conductor 40 receives the output of the differential amplifier 36.

A pair of rectifier tubes 38 and 39 are responsive to the pulse wave, previously mentioned, in a manner and for a purpose to be described hereinafter. The output of the rectifier tube 39 is impressed on a grid in each of the tubes 26 and 27, over a conductor 41, in a manner and for a purpose also to be described hereinafter. The output of the rectifier tube 38 is impressed on a triode 42 and the output of this tube is impressed on a grid of each of the tubes 28 and 29 similarly as with respect to the tubes 26 and 27.

A polar relay indicated generally by the numeral 43 is provided which is composed of four separate windings which control an armature 44.

The output of the limiter amplifier 19 passes over the conductor 22 and through a condenser 46 to a grid 47 of the triode 23.

The tube 23 has a cathode 51 which is connected through resistor 52 to ground and which is also connected by means of a conductor 53 to a junction point 54. The circuit from the cathode 51 is completed from junction point 54 by means of a conductor 56 leading to a grid 57 of the tube 28 and also by means of a conductor 58 leading to a grid 59 of the tube 26.

The tube 23 is also provided with an anode 61 which is connected over a conductor 62 to a junction point 63. The junction point 63 is connected through a resistor 64 to positive grounded battery 66 and over a conductor 67 and through a condenser 68 to a grid 69 of the tube 24.

The tube 24 is provided with an anode 72 which is connected by means of a conductor 73 to grounded positive battery 74. The tube is also provided with a cathode 76 which is connected through a resistor 77 to ground and which is also connected by a conductor 78 to a junction point 79. The circuit is completed from the junction point 79 by means of a conductor 81 which connects the conductor 78 to a grid 82 of the tube 29 and by a second conductor 83 which leads to the grid 84 of the tube 27.

Each of the tubes 26 to 29, inclusive, is provided with a cathode 86 which is grounded over an obvious circuit and with an anode 87 which is connected by means of conductors 88 to 91, inclusive, respectively, to one of the four windings 93 to 96, inclusive, of the polar relay 43. The opposite sides of each of the windings are connected over a common conductor 98 to positive grounded battery 99.

The stationary or pivoted end of the armature 44 is connected by means of a conductor 101 to a condenser 102 which is connected to and in parallel with the piezo electric crystal 13, referred to previously. The movable or left-hand end of the armature 44, as viewed in Fig. 1, moves between an upper contact which is not connected in any manner and a lower contact 103 which is connected over conductor 104 to the piezo electric crystal 13 and also to the oscillator circuit 12. Thus, at such time as the armature 44 is pivoted in its counterclockwise or lower position, as viewed in Fig. 1, it will be in engagement with the contact point 103 and will complete an electrical circuit through the piezo electric crystal 13 and the condenser 102.

As previously mentioned, the signal input passes over a conductor 31 to a limiter amplifier 32 and from the limiter amplifier over a conductor 34 to a differential amplifier 36. The output of the differential amplifier 36 which is in the form of a pulse wave, as may be seen as curve 37 of Fig. 2, passes over the conductor 40 to a junction point 106. Such voltage is further impressed through a condenser 107 and over a conductor 108 to the cathode 109 of the rectifier tube 38, and also over a conductor 111 and through a condenser 112 to an anode 113 of the rectifier tube 39 and through the reistors 114 and 116 to the cathode 117 of this tube. As may be noted, the conductor joining the resistors 114 and 116 is grounded over an obvious circuit.

The rectifier tube 38 is connected similarly to the tube 39; that is, the anode 118 thereof is connected to the cathode 109 over a conductor 119 and through a pair of resistors 121 and 122. Likewise, the conductor 119 is grounded intermediate the resistors 121 and 122, as may be seen by reference to Fig. 1.

The conductor 119 joining the anode 118 and the cathode 109 of rectifier tube 38 is connected by means of a conductor 123 and through a condenser 124 to the grid 126 of the triode 42. The conductor 123 is also connected through resistor 127 to the cathode 128 of this tube. The anode 129 of tube 42 is connected by means of a conductor 131 and through a resistor to grounded positive battery 132. The conductor 131 and the grounded battery 132 are connected through a condenser 133 and over a conductor 134 to a junction point 136 from whence a conductor 137 is connected to a grid 138 of the tube 29 and a conductor 139 extends to a grid 141 of the tube 28. The conductor 134 is grounded through a resistor 142.

The output of the rectifier tube 39, as was previously mentioned, is impressed on a conductor 41 which extends from the lead of the cathode 117 of the tube to a junction point 143 from whence it is connected over conductor 144 to a grid 146 of the tube 27 and over a conductor 147 to a grid 148 of the tube 26.

As has previously been mentioned, the voltage impressed from the limiter amplifier 19 and over the conductor 22 to the grid 47 of the triode 23 is of a square wave variety, as shown as curve 21 of Fig. 2. The tube 23 is ordinarily conditioned from positive battery 66 in such a manner that upon the positive part of the square wave voltage being impressed on the grid 47 thereof, the tube will operate and will cause the output thereof to be impressed over conductor 53 to the junction point 54 and thence over the conductors 56 and 58 to the grids 57 and 59 of the tubes 28 and 26, respectively. The output voltage of the tube 23, which is impressed on the grids as just described, takes the form of a positive square wave such as shown as curve 151 of Fig. 2.

The tube 24 is likewise responsive to the incoming square wave from the limiter amplifier but instead of the output of this tube having a positive square wave characteristic, such as shown as curve 151 of Fig. 2, the output is as shown as curve 152 of Fig. 2 which is exactly opposite to that of curve 151. The tube 24 will not be operated during the time of operation of the tube 23 because of the voltage drop across the junction point 63, but instead will operate or be rendered conductive during the time that the tube 23 is not operating. Thus, it is possible to derive outputs 180 degrees out of phase from the two tubes, as shown as curves 151 and 152, previously mentioned. The output of the tube 24 is impressed on conductor 78 to the junction point 79 and thence over the conductors 81 and 83 to the grids 82 and 84 of the tubes 29 and 27, respectively.

It has now been seen that the output of the oscillator circuit 12 after passing through the limiter amplifier 19 and the tubes 23 and 24 is impressed, under certain conditions, on one of the grids of each of the tubes 26 to 29, inclusive. However, as previously mentioned each of these tubes has two grids therein and are so constructed that the tube will not be rendered conductive or operating until such time as voltage is impressed on both of the grids concurrently. Thus, the tubes 26 to 29, inclusive, will not be rendered conductive due to the output of the oscillator circuit 12 alone.

Also, as previously mentioned, the signal input from a transmitting station was impressed through a limiter amplifier 32 and a differential amplifier 36, and over the conductor 40 to the junction point 106, from whence it was impressed on the rectifier tubes 38 and 39. The voltage impressed on these tubes has a pulse characteristic as shown as curve 37 of Fig. 2. Upon such voltage being impressed on the rectifier 39, over the conductor 111 and through the condenser 112, the tube operates resulting in the output thereof being impressed on the conductor 41 to the junction point 143 and thence over conductors 144 and 147 to the grids 146 and 148 of the tubes 27 and 26, respectively. Inasmuch as 39 is a rectifier tube the negative part of the pulse wave 37 (Fig. 2) will be eliminated and the voltage impressed on the grids 146 and 148 will have a characteristic as shown as curve 153 of Fig. 2.

Rectifier tube 38 will also receive voltage having a characteristic such as shown as curve 37 of Fig. 2, and will likewise suppress the negative half thereof and pass a voltage having a positive characteristic only similar to that shown at 153 in Fig. 2 over the conductor 123 and through the condenser 124 to the grid 126 of the triode 42. Upon such voltage being applied to the grid 126 of the tube 42 this tube will be rendered conducting and will result in the tube 42 operating and impressing a voltage which will pass from the anode 129 over the conductor 131, through the condenser 133, and over the conductor 134 to the junction point 136 from whence it will further pass over the conductors 137 and 139 to the grids 138 and 141 of the tubes 29 and 28, respectively. The output of tube 42 will thus have the same polarity as that of tube 39, but will correspond to the opposing signal change, as may be seen by reference to the voltage characteristic curve 154 of Fig. 2.

Under the condition as disclosed in the voltage chart of Fig. 2; that is, that the incoming line signals such as shown as curve 33 are in exact synchronism with the oscillator voltage and the limiter amplifier 19, such as shown on curve 21, the instant corrector circuit will not operate for correction purposes because under this condition the pair of grids in each of the tubes 26 to 29, inclusive, will not receive voltage impressed thereon simultaneously. However, in the event that the incoming line signals do not correspond exactly with the output of the standard frequency generator 11 a condition will exist whereby a pair of grids in one of the tubes 26 to 29, inclusive, will have voltage impressed thereon concurrently which will result in that particular tube becoming conductive or operating, which in turn causes the associated winding of the polar relay 43 to be energized to alter the speed of operation of the oscillator circuit.

If we assume, for example, that the generated frequency and the incoming line signals do not correspond (are out of phase) in such a manner that the grids 59 and 148 of the tube 26 have voltage impressed on them simultaneously, the tube will operate and the output thereof will be impressed over conductor 88, through the winding 95 of the polar relay 43, over the common conductor 98 to positive grounded battery 99, completing a circuit. Such will result, through the energization of the winding 95, in the armature 44 being attracted and moved in a clockwise direction, as seen in Fig. 1. Under this condition the electrical circuit which previously could be traced over the armature 44, the conductor 101, through the condenser 102, through the piezo electric crystal 13, over the conductor 104 and through the contact point 103 back to the armature 44, will be broken at the contact point 103 which will result in a decrease of impedance to the piezo electric crystal 13 which causes the crystal to vibrate at a higher frequency, thus increasing the frequency of the oscillator circuit 12. A similar condition will exist when both of the grids of the tube 28 have voltage impressed on them at the same time, resulting in the winding 93 of the polar relay 43 being energized and the armature 44 again moved in a clockwise direction.

In the event that the tubes 27 or 29 had been rendered conducting in a similar manner as with respect to the tubes previously described, the windings 96 and 94, respectively, of the polar relay 43 would become energized (that is one at a time) which would result in the armature 44 being moved in a counterclockwise direction, as seen in Fig. 1, so as to place the movable end thereof in engagement with the associated contact point 103, thus once again establishing the electric circuit through the piezo electric circuit 13 and the condenser 102, as previously described. Under this condition the impedance in the piezo electric crystal circuit is increased, thereby resulting in a reduced frequency vibration of the crystal 13 which results in a frequency reduction for the output circuit of the oscillator circuit 12. Under this condition the output of the circuit, as shown as curve 21 in Fig. 2. will be slowed down with relation to the incoming line signals, as shown as curve 33 (Fig. 2). Inasmuch as the separate windings 93 to 96, inclusive, are polar in variety, once one of these windings has been energized and the armature 44 attracted or repelled with respect to the contact point 103, it will remain in that position until such time as one of the windings which is opposite causes further movement thereof, all of which is well known with respect to polar relays.

Therefore, once the corrector circuit is operated to alter the impedance of the piezoelectric crystal circuit similar correction will be made thereto until such time as the output of the standard frequency generator 11 is in synchronism with the incoming line signals, at which time actual correction will cease. Such correction will be occurring continuously to keep the two voltages in synchronism and, therefore, to afford a proper operating speed for the receiving distributor 16. Inasmuch as the instant apparatus is for use in multiplex systems and the receiving distributor 16 is responsive to the signal impulses of a plurality of channels, the signal condition should be altered; that is, from marking to spacing or vice versa, relatively often. In the event that such a condition did not exist; that is, there was a continuous marking or spacing condition for a relatively long period of time, no correction would occur over this period because for the operation of the tubes 26 to 29, inclusive, it is necessary that there be a current reversal or change from marking to spacing (or vice versa) condition unless the conventional polarity changes are utilized between channels or impulses in a channel.

From the above description it may be seen that the present corrector circuit will operate constantly to cause the synchronism of the distributor operating means and the incoming code signals through the apparatus utilized herein. Further, it is to be noted that inasmuch as a piezo electric crystal is used to control the frequency of the oscillator circuit 12, the oscillator circuit will ordinarily be kept within a very narrow band of frequency change.

While particular tubes have been disclosed and specific connections therefrom described, it is to be understood that the present invention is not limited to the exact connections or apparatus shown but instead may be operated with any mechanism or parts which will provide a satisfactory operation thereof.

Figure 4:
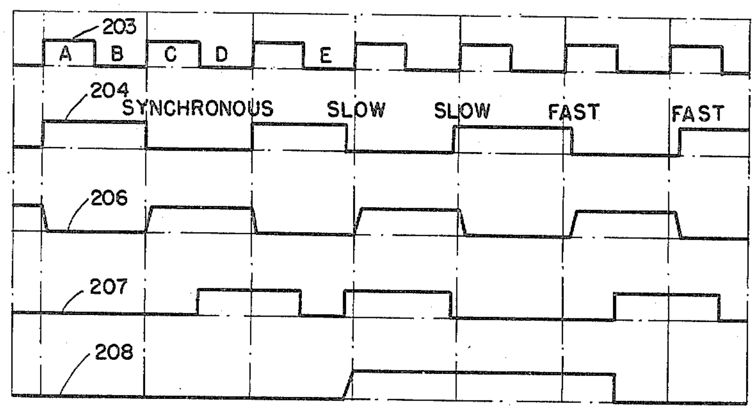
Fig. 4 is a voltage characteristic and operational chart of the second embodiment.

Referring now to Fig. 3, a second embodiment of the invention may be seen which is provided with mechanical relays, rather than inertialess relays in the form of tubes, as has been described above. Fig. 4 shows operational curves for various elements and voltage characteristics of the second embodiment.

The second embodiment includes a standard frequency generator indicated generally by the numeral 161 which comprises an oscillator circuit indicated generally as 162 which is controlled by a piezo electric crystal 163. The output of the standard frequency generator 161 is impressed on a conductor 164 to a receiving distributor indicated generally as 166, which it controls. The output of the standard frequency generator 161 is also impressed on a conductor 167 to a limiter amplifier 168 whereat the generated wave is squared off, such as shown as curve 203 in Fig. 4.

The square wave output of the limiter amplifier 168 passes over a conductor 169 to the left-hand winding of a polar relay 171, the right-hand winding of which is grounded at 172. An armature 173 of the polar relay 171 is connected by a conductor 174 to the armature 176 of a polar line relay 177. The left-hand winding of the line relay 177 is connected to a signal input 178, whereas the right-hand winding is grounded at 179. The armature 176 moves between a left-hand contact point which is connected to positive grounded battery 181 and a right-hand contact point which is connected to negative grounded battery 182.

The armature 173 of the relay 171 moves between a left-hand contact point which is connected by a conductor 183 to one winding of a polar relay 184 the opposite winding of which is grounded at 186, and a right-hand contact point which is connected by a conductor 187 and through a condenser 188 to an armature 189 of the relay 184.

The armature 189 of the relay 184 moves between a left-hand contact point which is connected by a conductor 191 to a winding 192 of a polar corrector relay 193, and a right-hand contact point which is connected by a conductor 194 to the opposite winding 196 of the corrector relay 193. The two windings 192 and 196 are both connected to grounded positive battery 197.

The corrector relay 193 is provided with an armature 198 which is connected at its pivoted end by a conductor 199 and through a condenser 201 to the oscillator circuit 162. The movable end of the armature 198 moves between a left-hand contact point which is unconnected and a right-hand contact point which is connected by a conductor 202 to the oscillator circuit 162. The piezo electric crystal 163 is connected across the conductors 199 and 202 in such a manner as to be between the condenser 201 and the oscillator circuit 162. The condenser 201 is in parallel with the piezo crystal 163. It should be noted, however, that other connections are possible, or inductors may be used, any alteration of the impedance of the circuit sufficing.

The incoming line signals from the distant transmitting station, which comprise the signal input and which are directed over the conductor 178 to the one winding of the line relay 177, take the form of a square wave, such as 204 of Fig. 4, assuming an ideal condition. If they are in phase with the output of the standard frequency generator 161 a condition will exist where the two wave fronts and ends will compare, as may be seen at the start of the curves 203 and 204 of Fig. 4, which signifies synchronism.

Referring further to Fig. 4, the curve 206 discloses the condition of the switching relay 184 with respect to the other elements, whereas the curve 207 shows the condition of the condenser 188 and the curve 208 shows the condition of the corrector relay 193. The curve 203, described as the squared off and amplified output of the standard frequency generator 161 is also indicative of the condition of the relay 171, whereas the curve 204 which shows the input signals also signifies the condition of the line relay 177.

Prior to a description of the operation it should be noted that an assumption has been made that when the winding 196 of the corrector relay 193 receives a negative potential it will cause the armature 198 to move to the left and when it receives a positive potential it will cause the armature to move to the right. Likewise, when the winding 192 receives a positive potential it will cause the armature 198 to move to the left whereas when it receives a negative potential it will cause it to move to the right.

In considering the operation of the corrector circuit let it be assumed that the previous condition has been such as to cause the armature 198 of the corrector relay 193 to be toward the left in engagement with the unconnected contact point.

In the following description of the operation reference should be made to Fig. 4, as well as Fig. 3, inasmuch as the description is based on the standard frequency pulses with respect to the line signals, as seen as curves 203 and 204, respectively. As may be seen by reference to these curves the initial condition to be described is when the frequency pulses and the signal impulses are in synchronism, that is, their wave fronts and ends coincide from a time standpoint.

The alternate positive and zero conditions of the square wave generated by the standard frequency generator 161 operates the polar relay 171 in such a manner as to cause the armature 173 thereof to be moved to the left during the positive portion of the wave and toward the right during the zero portion of the wave. Therefore, during the first positive portion, labelled A, the armature 173 will be toward the left and in engagement with its associated contact point connected to the conductor 183. At the same time, under the assumed conditions of curve 204 (signal impulses) of Fig. 4, it may be seen that a marking or negative condition exists on the signal input line 178, which causes the line relay 177 to operate and move the armature 176 to the right, if it previously was not in this position. An electrical circuit may be traced from negative grounded battery 182, through the armature 176 of the line relay 177, over the conductor 174, through the armature 173 of the relay 171 (now toward the left), over the conductor 183 to the winding of the relay 184 and to ground 186. A negative condition on the relay 184 causes the armature 189 thereof to be moved toward the right, conditioning an electrical circuit over the conductor 194 to the winding 196 of the corrector relay 193. For illustration purposes curve 206 of Fig. 4 shows the condition of the relay 184, the downward drop at the start of the curve signifying that the armature 189 has moved toward the right.

During the above condition, with the armature 189 toward the right, no circuit will be established to affect the winding 196 of the corrector relay 193 as the conductor 187 and condenser 188 connected to the armature 189 are not in contact with the armature 173 of the relay 171, as this armature is in its leftward position. If it is assumed that the condenser 188 has previously been charged negatively its curve will appear at this time as a straight line, as seen at the initial portion of curve 207 of Fig. 4. Inasmuch as the relay 193 is not effected and its armature 198 remains toward the left against the unconnected contact point its curve will also appear as a straight line, as at the initial portion of curve 208 of Fig. 4.

The corrector frequency pulse will now change from a positive to a zero condition, as indicated as B interval on the curve 203 of Fig. 4. As a result of such change the relay 171 will be operated to cause the armature 173 thereof to move to the right. An electrical circuit may now be traced from negative grounded battery 182, through the armature 176 of the line relay 177 (which remains toward the right), over the conductor 174 and through the armature 173 which has just moved to the right, over the conductor 187 and through the condenser 188, through the armature 189 of the relay 184 which remains toward the right as the circuit for the relay 184 was broken by the clockwise movement of armature 173, over the conductor 194 to the winding 196 of the corrector relay 193, and thence through battery 197 to ground. As negative potential is applied to the winding 196, the armature remains toward the left in engagement with the unconnected contact point. Inasmuch as the line relay 177, the switching relay 184, the condition of the condenser 188, and the corrector relay 193 were not altered, their curves 204, 206, 207, and 208, respectively, remain as straight lines, as may be seen in Fig. 4.

In the next existing condition the frequency pulse is again reversed, this time from zero to a positive value, as illustrated as C on curve 203. This results in the relay 171 operating to move its armature 173 to the left, as initially described. However, the initially described condition does not exist at this time as the incoming signal impulse has changed from a negative marking condition to a positive spacing condition, as shown on curve 204 of Fig. 4. This results in the armature 176 of the line relay being moved toward the left, thereby engaging the left contact point and connecting the armature to the positive grounded battery 181.

An electrical circuit may now be traced from positive grounded battery 181, through the armature 176 and over the conductor 174, through the armature 173 of the relay 171, which has moved to the left, over the conductor 183, and through the winding of the relay 184 to ground 186. The positive potential passing through the winding of the relay 184 will cause it to operate and move its armature 189 toward the left, as may be noted by the curve 206 rising at this point. The winding 192 of the corrector relay 193, which is now connected to the armature 189 over the conductor 191, will not be effected at this time, as the armature 173 is not connected to the conductor 187 and so no electrical circuit is established. Likewise, the condenser 188 is not affected, and therefore the curves 207 and 208 remains as straight lines.

Thereafter, the standard frequency will again change from a positive value to zero, as seen as D on curve 203, and the relay 171 will be operated to cause its armature 173 to move to the right. The condition of relay 184 will not be affected, as the armature 173 no longer is connected to the conductor 183. An electrical circuit may now be traced from grounded positive battery 181, through the armature 176 of the line relay 177, over the conductor 174, through the armature 173 of the relay 171, over the conductor 187 and through the condenser 188, which will pass positive potential as it was negatively charged, through the armature 189 of the relay 184, over the conductor 191, through the winding 192 of the relay 193, and through grounded battery 197. Inasmuch as the winding 192 receives a positive potential the armature 198 of relay 193 will remain toward the left, engaging the unconnected contact point. As the relay 184 did not change during this interval its curve 206 remains as a straight line, as does the curve 208 of the also unoperated corrector relay 193. However, as the polarity was reversed with respect to the condenser 188, and it passes potential therethrough, its curve 207 will rise, as may be seen in Fig. 4.

Following the spacing impulse another negative marking impulse is received, as may be seen on curve 204 of Fig. 4. During the initial part of this impulse the line relay 177, relay 171, and relay 184 will operate as has been described previously. Likewise, the corrector relay 193 will not be affected, and the armature 198 thereof will remain positioned toward the left. Also, during this interval the condenser 188 will not be affected, as the armature 173 of the relay 171 is positioned toward the left.

During the latter part of the signal impulse, which coincides with interval E of the frequency curve 203, Fig. 4, the relay 171 will operate to position the armature 173 toward the right. An electrical circuit may then be traced from grounded negative battery 182, through the armature 176 and over the conductor 174 to the armature 173 of the relay 171, through this armature, over the conductor 187 and through the condenser 188, causing the condenser to pass current as the polarity of the potential is now reversed to that previously charging the condenser. Such condenser change may be seen by reference to curve 207, Fig. 4, where the curve drops to its original value. The circuit may be further traced through the armature 189 (now toward the right), over the conductor 194, and through the winding 196 of the corrector relay 193 to ground. This relay is not affected, however, as a negative potential on the winding 196 causes the armature 193 to be moved toward the left, in which position it is already resting.

By comparing the curves 203 and 204 of Fig. 4 it may be seen that the line signal ends prior to the end of the E frequency pulse or interval. This shows that the two waves are no longer in synchronism, but instead, that the line impulse is slow with respect to the frequency pulse generated. The change of the line signal impulse at this point from negative marking to positive spacing causes the line relay 177 to operate and position the armature 176 toward the left and thus connect it with positive grounded battery 181. An electrical circuit may now be traced from positive grounded battery 181, through the armature 176 and over the conductor 174, through the armature 173 of the relay 171 (now positioned to the right), over the conductor 187 and through the condenser 188, which passes potential because it is of reversed polarity as may be seen on curve 207 of Fig. 4, through the armature 189 of the relay 184 (now positioned toward the right), over the conductor 194 and through the winding 196 of the corrector relay 193 to ground. The positive potential through the winding 196 will cause the relay 193 to operate to position the armature 198 toward the right. This is shown by the rise in the curve 208 of Fig. 4.

Upon the armature 198 moving to the right an electrical circuit is established which may be traced from the oscillator network 162, through the condenser 201, over the conductor 199, through the armature 198, and over the conductor 202 back to the oscillator circuit 162. As was previously mentioned, the condenser 201 is in parallel with the piezo electric crystal 163, and thus varies the impedance of the crystal circuit. Such condition results in a decreased vibration of the crystal 163 which causes a change in the pulses generated by the standard frequency generator 161. Such change will tend to slow down the pulses generated with respect to the line impulses, to allow them to regain synchronism.

As the frequency pulse changes to a positive value the armature 173 of the relay 171 will be moved to the left, thereby establishing an electrical circuit from positive grounded battery 181, through the armature 176 of the line relay 177, over the conductor 174, through the armature 173 of the relay 171, over the conductor 183 and through the winding of the relay 184 to ground 186. The relay 184 will operate to move the armature 189 to the left, as may be seen by the change of curve 206, Fig. 4. The corrector relay 193 will not be affected during this interval, as no circuit can be traced through the armature 173 to the conductor 187, and thus its curve 208 will remain at a straight line.

As the frequency pulse drops to zero the relay 171 is operated to move the armature 173 to the right, thus extending positive potential to the conductor 187 and through the condenser 188, thence through the armature 189, over the conductor 191, and through the winding 192 to ground. As positive potential previously charged the condenser 188 it will not be affected at this time. Positive potential through the winding 192 of the relay 193 normally causes the armature 198 to be moved to the right, but as it is already in that position nothing further occurs.

It may be seen by comparing curves 203 and 204 of Fig. 4, the line impulse changes from a positive spacing condition to a negative marking condition prior to the end of the zero interval of the frequency pulse, which indicates that the line signal is still slow with respect thereto. This causes the line relay 177 to operate and move the armature 176 to the right, thereby connecting it to negative grounded battery 182.

An electrical circuit may thus be traced from negative grounded battery 182, through the armature 176 and over the conductor 174, through the armature 173 of the relay 171, over the conductor 187 and through the condenser 188, which passes potential as the polarity has reversed from positive to negative (see curve 207 for change), through the armature 189 of the relay 184, over the conductor 191, and through the winding 192 of the corrector relay to ground. The negative potential being applied to the winding 192 causes the armature 198 to move to the right, in which direction it already is positioned. Therefore, corrector relay 193 is not changed, and it still operates to correct as seen by the plus value of the curve 208, Fig. 4.

Shortly thereafter the frequency pulse (curve 203, Fig. 4) rises from zero to its positive value, causing the relay 171 to operate and move the armature 173 to the left. This results in negative potential passing through the armature 173, over the conductor 183, and through the winding of the relay 184 to ground. This causes the relay 184 to operate and to move its armature to the right, connecting it with the conductor 194. The conductor 194 is not effective to complete a circuit at this time, however, as the armature 173 is positioned to the left. Thus, neither condenser 188 nor corrector relay 193 is affected.

Thereafter the frequency pulse drops to zero again, causing the relay 171 to operate to move the armature 173 to the right. However, inasmuch as the condenser 188 was previously negatively charged, and as the armature 189 of the relay 184 remains toward the left, neither the condenser 188 nor the corrector relay 193 will be affected at this time.

The frequency pulse will once again rise from zero to a positive value, causing the relay 171 to operate to move its armature 173 to the left. It is to be noted that the signal impulse did not change when the frequency pulse rose to its positive value, but instead changes to a positive spacing condition shortly after such change. Such a condition signifies that the frequency pulses are now fast with respect to the line signal impulses, and the latter therefore will have to be speeded up for maximum efficiency of operation. It should be understood that in actual operation the system would, in all probability, because of the crystal control of the speed, change from a slow to synchronous condition before changing to a fast condition. However, the instant example has been utilized for illustrative purposes, even though unlikely in actual operation.

As a result of the armature 173 moving to the left an electrical circuit is established which may be traced from negative grounded battery 182, through the armature 176 of the line relay 177, over the conductor 174, through the armature 173, over the conductor 183, and through the winding of the relay 184 to ground 186. However, as the armature 189 of the relay 184 was previously positioned toward the left, no change will occur.

At the time that the signal impulse changes from negative marking to positive spacing the line relay 177 will be operated to move the armature 176 toward the left. An electrical circuit may now be traced from positive grounded battery 181, through the armature 176, over the conductor 174, through the armature 173, over the conductor 183, and through the winding of the relay 184 to ground 186. As the potential applied to the winding is now positive instead of negative the armature 189 will be positioned toward the left, causing a rise in the curve 206, Fig. 4, at this point. However, as the armature 173 is now positioned at the left there can be no change of the condenser 188 or the corrector relay 193 at this time.

As the frequency impulse changes from positive to its zero condition the armature 173 of the relay 171 is once again moved to the right. An electrical circuit is now established from positive grounded battery 181, through the armature 176, over the conductor 174, through the armature 173, over the conductor 187 and through the condenser 188, which now passes potential due to the reversal from negative to positive, as may be seen on curve 208 of Fig. 4, through the armature 189, over the conductor 191, and through the winding 192 to ground. The positive potential applied to the winding 192 causes the relay 193 to operate to move its armature 198 toward the left, to engagement with its unconnected contact point. Such movement of the armature 198 breaks the previously established corrector circuit which had placed the condenser 201 in circuit with the piezo crystal 163, thereby reducing the impedance of the crystal circuit and causing the vibration of the crystal to speed up with a similar change to the standard frequency generator 161. The frequency pulses will now be speeded up in order to synchronize them with the incoming line signals.

By further tracing the conditions, as shown as curves 203 and 204 of Fig. 4, for the frequency pulses and the signal impulses, it may be seen that the relay 184, the condenser 188, and the corrector relay 193 will operate in accordance with the curves 206, 207, and 208, respectively.

Thus, it has been seen that the second embodiment of the invention compares the frequency pulses and the signal impulses, and automatically causes the operation of the corrector network to bring them into synchronism in the event that such condition does not exist.

While two embodiments of the invention have been shown and described, it will be understood that these embodiments are but illustrative and that various modifications may be made therein without departing from the scope and spirit of this invention.

What is claimed is:

1. In a corrector circuit, a pulse generator, crystal control means for controlling said pulse generator, a first pair of electron tubes responsive to the generated pulses, a second pair of electron tubes responsive to variable signal impulses from a remotely located transmitter, a plurality of electron tubes under the dual control of said first pair and said second pair of electron tubes, and means for varying said crystal control means under the control of said plurality of electron tubes, whereby the output of said pulse generating means is altered.

2. In a corrector circuit, a pulse generator, crystal control means for controlling said pulse generator, a condenser for varying the impedance of said crystal control means, a first pair of electron tubes responsive to the generated pulses, a second pair of electron tubes responsive to variable signal impulses from a remotely located transmitter, a plurality of electron tubes under the dual control of said first pair and said second pair of electron tubes, and means for causing said condenser to be placed in circuit with said crystal control means under the control of said plurality of electron tubes, whereby the output of said pulse generating means is altered.

3. In a corrector circuit, a pulse generator, crystal control means for controlling said pulse generator, a condenser for varying the impedance of said crystal control means, a first pair of electron tubes responsive to the generated pulses, a second pair of electron tubes responsive to variable signal impulses from a remotely located transmitter, a plurality of electron tubes under the dual control of said first pair and second pair of electron tubes, a relay controlled by said plurality of electron tubes, and means for causing said condenser to be placed in circuit with said crystal control means under the control of said relay, whereby the output of said pulse generating means is altered.

4. In a corrector circuit, a pulse generator, crystal control means for controlling said pulse generator, a first pair of electron tubes responsive to the generated pulses, a second pair of electron tubes responsive to variable signal impulses from a remotely located transmitter, a plurality of electron tubes under the dual control of said first pair and said second pair of electron tubes, a relay controlled by said plurality of electron tubes, and means for varying said crystal control means under the control of said relay, whereby the output of said pulse generating means is altered.

REGINALD G. SCHULER.

REFERENCES CITED

The following references are of record in the file of this patent:

UNITED STATES PATENTS

| Number | Name | Date |
|---|---|---|
| 1,934,400 | Bollman | Nov. 7, 1933 |
| 2,173,902 | Gerth et al. | Sept. 26, 1939 |
| 2,246,284 | Artzt | June 17, 1941 |
| 2,249,435 | Potts | July 15, 1941 |
| 2,252,380 | Kahn | Aug. 12, 1941 |
| 2,258,151 | Shenk | Oct. 7, 1941 |
| 2,258,252 | Shenk | Oct. 7, 1941 |
| 2,309,622 | Anderson | Feb. 2, 1943 |
| 2,329,077 | Nichols | Sept. 9, 1943 |
| 2,350,008 | Artzt | May 30, 1944 |
| 2,359,649 | Kahn | Oct. 3, 1944 |
| 2,363,062 | Hartley | Nov. 21, 1944 |
| 2,371,905 | Mathes | Mar. 20, 1945 |
| 2,399,421 | Artzt | Apr. 30, 1946 |